Feb. 11, 1936.  W. R. FREEMAN  2,030,287
BRAKE CONTROL MECHANISM
Filed April 8, 1935  2 Sheets-Sheet 1
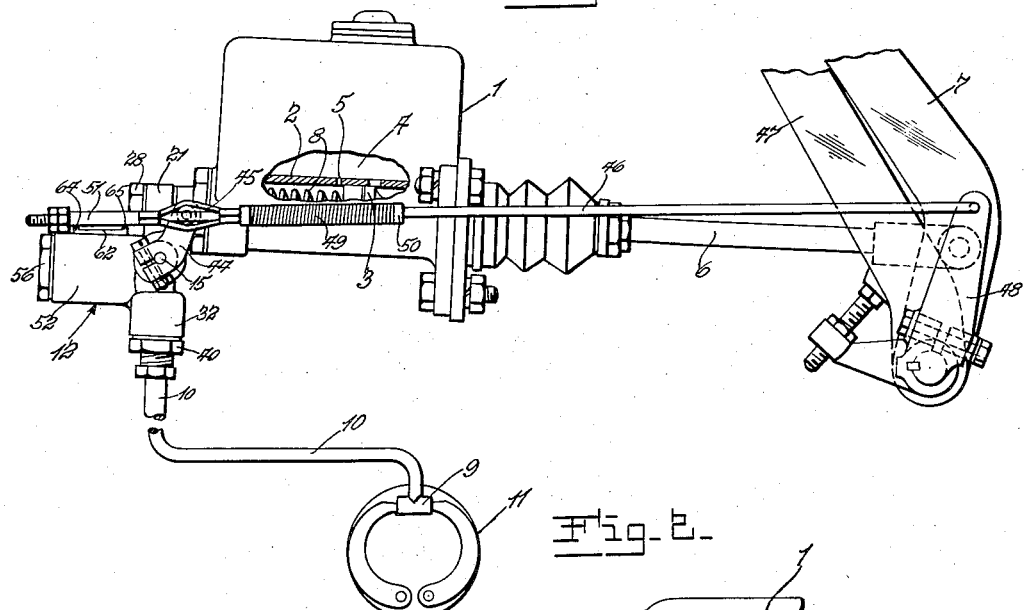
INVENTOR.
Walter R. Freeman
BY
E. E. Huffman
ATTORNEY.

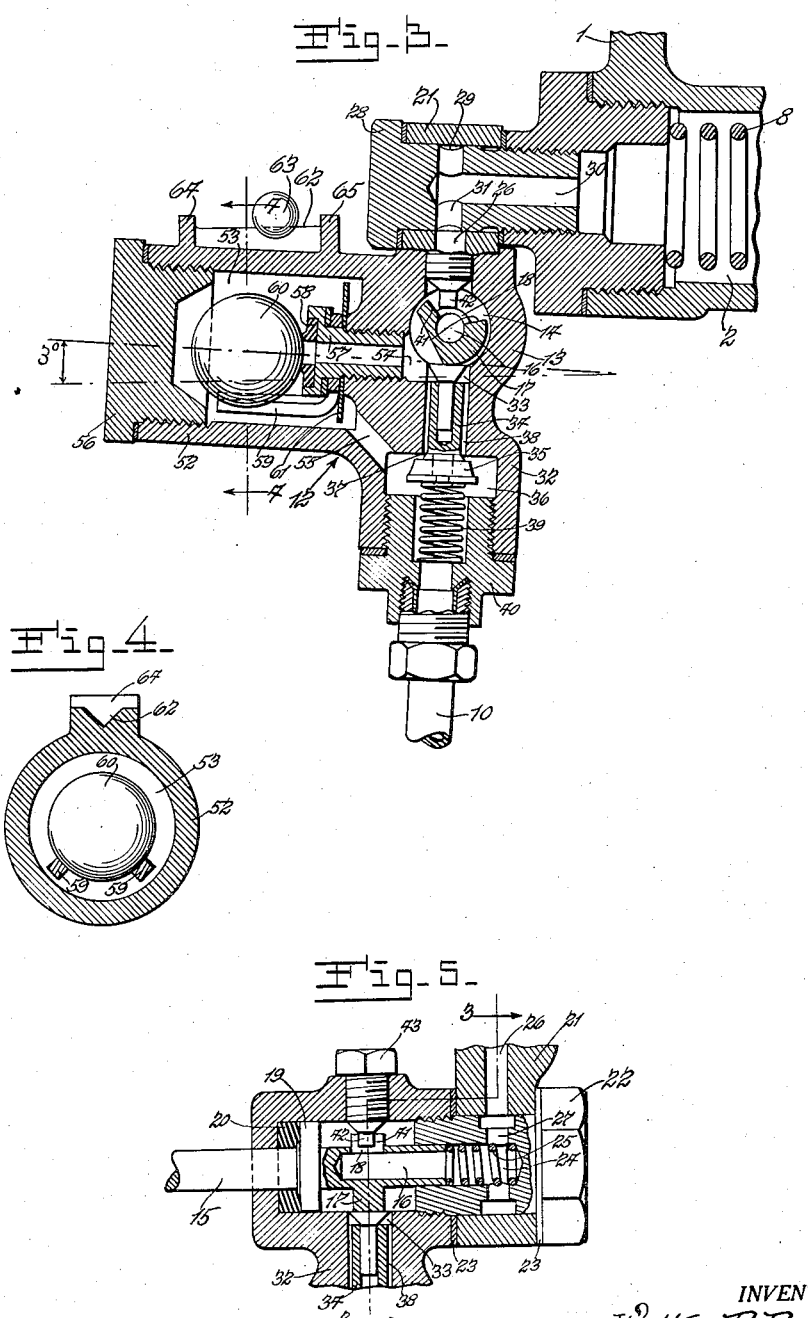

Patented Feb. 11, 1936

2,030,287

UNITED STATES PATENT OFFICE 2,030,287

BRAKE CONTROL MECHANISM

Walter R. Freeman, St. Louis, Mo., assignor to Wagner Electric Corporation, St. Louis, Mo., a corporation of Delaware Application April 8, 1935, Serial No. 15,238

15 Claims. (Cl. 192—13)

My invention relates to brakes for motor vehicles and more particularly to means for holding the brakes in applied position without the necessity of maintaining the brakes applied by the use of manual applying means.

One of the objects of my invention is to provide a braking system with means to prevent release of the brakes from applied position which is effective only when the vehicle is decelerating at a predetermined rate or when the vehicle is stopped.

Another object of my invention is to provide a braking system of a vehicle with a brake release preventing means which is governed by gravity and by the deceleration of the vehicle and is operable only when the clutch mechanism is in disengaged position.

A more specific object of my invention is to provide a hydraulic brake mechanism for a vehicle with a valve for preventing release of the brakes from applied position and a by-pass for said valve governed by gravity and by deceleration of the vehicle.

Other objects of my invention will become apparent from the following description taken in connection with the accompanying drawings in which Figure 1 is a side view of a hydraulic brake actuating system embodying my invention; Figure 2 is a top view of the release preventing valve structure; Figure 3 is a cross-sectional view of the valve structure taken on the line 3—3 of Figure 5; Figure 4 is a cross-sectional view taken on the line 4—4 of Figure 3; and Figure 5 is a cross-sectional view taken on the line 5—5 of Figure 2.

I have disclosed my invention as being applied to a hyldraulic brake actuating system but it will be understood that it can be employed in association with other types of brake actuating apparatus.

Referring to the drawings, the master cylinder device 1 is of well-known construction and comprises a cylinder 2, a piston 3 reciprocal therein, and a reservoir 4 in communication with the cylinder 2 by means of compensating port 5, which port is positioned immediately ahead of the piston when in its normally retracted position. The piston 3 is actuated by means of a piston rod 6 connected to the brake pedal 7. The piston is biased to its normally retracted position by means of return spring 8. The forward end of the cylinder is in communication with the wheel cylinder 9 (one only being shown) by means of the conduit 10. The wheel cylinder 9 is adapted to apply the brake 11 in a well-known manner.

In accordance with my invention, I have embodied my novel brake release preventing means 12 in the conduit 10 leading from the master cylinder device to the wheel cylinder. In the specific embodiment disclosed, this brake release preventing means is attached to and carried by the end of the master cylinder device but it may, if desired, be positioned at another point in the conduit 10.

The brake release preventing means 12 comprises a casing 13 provided with a chamber 14 in which is mounted a cam shaft 15 having an integral cam 17. The shaft extends to the exterior of the casing and a portion thereof is of hollow construction to provide a passage 16 which is in communication with the chamber 14 through an opening 18 formed in a cut-away portion of the cam. The cam shaft is also provided with an annular shoulder 19 and a packing 20 for sealing the opening through which the shaft extends.

The casing 13 has clamped thereto an attaching member 21, the clamping bolt 22 being screw-threaded into the open end of the chamber 14. Suitable packing washers 23 assist in sealing the attaching member to the casing. The attaching bolt 22 is provided with a central bore 24 adapted to receive the hollow end of the cam shaft 15. A spring 25 is interposed between the bolt and the cam shaft and by means of its axial thrust is adapted to maintain a sealing pressure on the packing 20. The attaching member 21 has formed therein a passage 26 in communication with the bore of the bolt by means of a cross-passage 27 in the bolt. The entire release preventing means is attached to the end of the master cylinder device by a bolt 28 which extends through an opening 29 in the attaching member to thereby clamp said attaching member to the master cylinder device. The attaching bolt 28 is formed with a longitudinal passage 30 and a cross-passage 31.

The casing 13 has integral therewith a downwardly extending portion 32 having a passage 33 therein communicating with the chamber 14. A valve stem 34 is carried in passage 33 and has mounted on its outer end a valve 35, this valve lying in a chamber 36. The valve 35 is of rubber and adapted to cooperate with a valve seat 37 for controlling the passage 33. In order to permit fluid to flow freely through passage 33, the valve stem is formed with longitudinal grooves 38. The valve is normally biased toward its seat by a suitable spring 39 interposed between the valve and the connecting means 40 which connects the conduit 10 to the casing extension 32.

The cam 17 on the cam shaft cooperates with the valve stem 34 for positively opening the valve. The cam is provided with a pair of stops 41 cooperating with the fixed stop member 42 carried on the end of a set-screw 43 extending into the chamber 14, whereby the rotational movement of the cam shaft is limited. The external end of the cam shaft has clamped thereon an arm 44 to which is pivoted a member 45 carried by an actuating rod 46. This actuating rod may be connected to any suitable manual control means but in my preferred construction I connect this rod to the clutch pedal 47, thereby controlling the valve 35 from the clutch mechanism. The connection between rod 46 and the clutch pedal is by means of a separate arm 48 secured to the clutch shaft. The member 45 is connected to rod 46 through a spring 49, one end of the spring engaging the member 45 and the other end engaging a stop 50 on the rod. The rod 46 is also provided with a sleeve 51 adjustably mounted on the end of the rod in order to produce a positive connection between the rod and the member 45 when the rod is moved to the right, as viewed in Figure 1.

The casing 13 has formed thereon a second extension 52 having a chamber 53 in communication with chamber 14 by passage 54 and also in communication with chamber 36 by passage 55. The passage 54 of chamber 53 and the passage 55 form a by-pass around the valve 35. The casing extension 52 is constructed with a removable head 56.

The passage 54 receives a threaded plug 57 of hollow construction. The end of the plug lies in the chamber 53 carrying a rubber valve seat 58. Aside from carrying the valve seat, the plug is adapted to clamp a track member 59 to the casing, this track member being formed with two spaced apart fingers upon which a ball 60 is adapted to roll. The fingers of the track are parallel with the axis of the plug 57 and the ball 60 is of such diameter that when mounted upon the track, its center will lie on the plug axis. The ball 60 is adapted to roll freely back and forth on its track and when in its extreme right-hand position, it will cooperate with the rubber valve seat 58 to close passage 54, and when the ball is in its left-hand position, the passage 54 will be in free communication with chamber 53. The by-pass around the valve 35 is thus controlled by the ball.

The casing 13 is so positioned that the track 59 will be at an angle of approximately 3 degrees to the plane of the support of the vehicle, such angle being suitable to achieve the result that when the vehicle is stopped on either a level or ascending roadway, the ball 60 will position itself in engagement with valve seat 58 to close passage 54, and when the vehicle is decelerating, the inertia of the ball will be sufficient to maintain it out of engagement with the valve seat 58.

A baffle member 61 is also carried by the plug 57, the purpose of which is to prevent liquid flowing into chamber 53 by means of passage 55, from impinging upon the ball 60 and affecting its operation.

Assuming that the vehicle is stopped on either a level or ascending roadway, the ball 60 will engage valve seat 58. If under these conditions the clutch is disengaged and the brakes applied, the brakes will be maintained in applied position by the action of valve 35 and the ball 60, since fluid under pressure cannot flow back into the cylinder of the master cylinder device. The brake pedal can be released under these circumstances and the brakes will be maintained in applied position as long as the clutch mechanism remains disengaged. When the clutch mechanism is permitted to engage, cam 17 will open valve 35 and release the brakes.

When the vehicle is traveling in the forward direction on either a level or a downgrade, it is desirable to have the brake holding means ineffective and the brakes solely under the control of the brake pedal regardless of whether the clutch mechanism is engaged or disengaged. The structure just described permits such brake operation under these conditions. As soon as the brakes are applied, when the vehicle is moving forward, the vehicle immediately begins to decelerate. Since the ball 60 may freely roll on its track, its inertia will cause it to move to the left, away from the valve 58. Under these conditions the by-pass around valve 35 will be open, thus permitting the brakes to be controlled in the same manner as they would be controlled if the brake release preventing means were not interposed in the conduit. The position of valve 35 and the clutch mechanism will be of no consequence. Unless the vehicle comes to a stop on either a level or ascending roadway, the ball 60 will roll to the right into engagement with the valve seat under the action of gravity.

If the clutch mechanism is in disengaged position and it is desired to apply the brakes, liquid under pressure will flow from the master cylinder to the braking system by way of the by-pass since this is the path of least resistance, it being easier to unseat the ball from seat 58 than it is to unseat the spring biased valve 35. When the clutch mechanism is in engaged position, as shown in Figure 3 wherein the cam 17 is in a position maintaining the valve 35 open, the position of the ball 60 will in no way control the brakes. The fluid under these conditions is free to flow to the brakes either by way of the by-pass or through valve 35 and from the brakes through the valve 35.

The baffle plate 61 prevents fluid from the brake system from impinging directly upon the ball and thereby unseating it. If it were not for the baffle, this could happen if the brakes were quickly applied and released.

When the vehicle is on a descending roadway it is not necessary to have any means for preventing release of the brakes for in that event no problem is present in manipulating the clutch, the brakes, and the throttle in starting the vehicle.

In order to facilitate the proper positioning of the track 59 of ball 60 so that it will be at a three degree angle with the base on which the vehicle sets, I have shown the top of the casing portion 52 formed with a track 62. When the vehicle is on a level base and the track 62 is horizontal, track 59 will be at an angle of three degrees thereto. To determine when the track 62 is horizontal, when the vehicle is on a level base, a ball such as 63 may be placed on track 62 and the casing so positioned that the ball will not roll. Other means may also be employed to readily determine when track 59 is properly positioned, as for example, a level. In using a level it may be placed on the special lugs 64 and 65 and when the level indicates that the tops of the lugs are horizontal, track 59 is at its proper angle.

Having fully described my invention, what I claim as new and desire to secure by Letters Patent of the United States is:

1. In a motor vehicle provided with brakes and means for applying the brakes, means for preventing release of the brakes from applied position notwithstanding the applying means permits release thereof, said release preventing means comprising manually-controlled means and independently operable gravity controlled means, said gravity-controlled means being capable of assuming a position other than the position preventing release of the brakes whereby the brakes may be freely applied and released even though the manually-controlled means is in release preventing condition.

2. In a motor vehicle provided with brakes and means for applying the brakes, means for preventing release of the brakes from applied position notwithstanding the applying means permits release thereof, said release preventing means comprising two independently operable means, one of which is controlled by gravity and deceleration of the vehicle, and the other of which is manually controlled.

3. In a motor vehicle provided with clutch mechanism, brakes and means for applying the brakes, means for preventing release of the brakes from applied position nothwithstanding the applying means permits release thereof, said release preventing means comprising clutch-controlled means and independently operable gravity-controlled means, said gravity-controlled means being capable of assuming a position other than the position preventing release of the brakes whereby the brakes may be freely applied and released even though the clutch-controlled means is in release preventing condition.

4. In a motor vehicle provided with clutch mechanism, brakes and means for applying the brakes, means for preventing release of the brakes from applied position notwithstanding the applying means permits release thereof, said release preventing means comprising two independently operable means, one of which is controlled by gravity and deceleration of the vehicle, and the other of which is controlled by the clutch mechanism.

5. In a motor vehicle provided with fluid-operated brakes, the combination with a conduit for conveying the operating fluid to the brake unit, means comprising two valve elements for preventing release of the brakes from applied position, one of said valve elements comprising a seat and a cooperating rolling ball adapted to be seated by gravity and the other valve element adapted to be manually controlled.

6. In a motor vehicle provided with fluid-operated brakes, the combination with a conduit for conveying the operating fluid to the brake unit, means comprising two valve elements for preventing release of the brakes from applied position, one of said valve elements adapted to be closed by gravity and opened by inertia during deceleration of the vehicle, and the other valve element adapted to be manually controlled.

7. In a motor vehicle provided with clutch control mechanism and with fluid-operated brakes, the combination with a conduit for conveying the operating fluid to the brake unit, means comprising two valve elements for preventing release of the brakes from applied position, one of said valve elements being operated by the clutch control mechanism and the other valve element comprising a seat and a cooperating rolling ball adapted to be seated by gravity, said ball being capable of assuming an unseated position permitting free application and release of the brakes notwithstanding the clutch-operated valve is in a position preventing release of the brakes.

8. In a motor vehicle provided with clutch control mechanism and with fluid-operated brakes, the combination with a conduit for conveying the operating fluid to the brake unit, means comprising two valve elements for preventing release of the brakes from applied position, one of said valve elements being operated by the clutch control mechanism and the other valve element adapted to be closed by gravity and opened by inertia during deceleration of the vehicle.

9. In a motor vehicle provided with clutch control mechanism and with fluid-operated brakes, the combination with a conduit for conveying the operating fluid to the brake unit, means for preventing release of the brakes from applied position, said means comprising a valve in said conduit and controlled by the clutch control mechanism, a passage around said valve, and gravity-controlled means comprising a rolling ball having a cooperating seat for closing said passage.

10. In a motor vehicle provided with clutch control mechanism and with fluid-operated brakes, the combination with a conduit for conveying the operating fluid to the brake unit, means for preventing release of the brakes from applied position, said means comprising a valve in said conduit and controlled by the clutch control mechanism, a passage around said valve, and a gravity-controlled rolling ball for preventing fluid from flowing from the brake unit through the passage.

11. In a motor vehicle provided with clutch control mechanism and with fluid-operated brakes, the combination with a conduit for conveying the operating fluid to the brake unit, means for preventing release of the brakes from applied position, said means comprising a valve in said conduit and controlled by the clutch control mechanism, a passage around said valve, and means controlled by gravity for closing said passage and by the deceleration of the vehicle for opening said passage.

12. In a motor vehicle provided with clutch control mechanism and with fluid-operated brakes, the combination with a conduit for conveying the operating fluid to the brake unit, means for preventing release of the brakes from applied position, said means comprising a valve in said conduit and controlled by the clutch control mechanism, a passage around said valve, a ball for controlling said passage, and a track for said ball, said track being positioned at a small angle to the plane of the surface upon which the vehicle operates.

13. In a motor vehicle provided with a braking system and means for applying the brakes, means for preventing release of the brakes from applied position, said means comprising a ball and track carried by and enclosed in a casing, said track being positioned at an angle to the horizontal when the vehicle is on a horizontal base, and means on the exterior of the casing for cooperation with a portable member for indicating the proper position the casing must assume to have the track at the desired angle.

14. In a motor vehicle provided with brakes and means for applying the brakes, means for preventing release of the brakes from applied position, said means comprising a movable ball which is adapted to be moved by the action of gravity to a position to cause said release preventing means to be operable, and which is adapted to be moved under the influence of inertia during deceleration of the vehicle to a position to cause said release preventing means to be inoperable.

15. In a motor vehicle provided with fluid actuated brakes, valve means for preventing release of the brakes from applied position, said means comprising a ball adapted to be moved to valve closed position by the action of gravity, and to valve open position by the action of inertia during deceleration of the vehicle.

WALTER R. FREEMAN.